UNITED STATES PATENT OFFICE 2,472,645

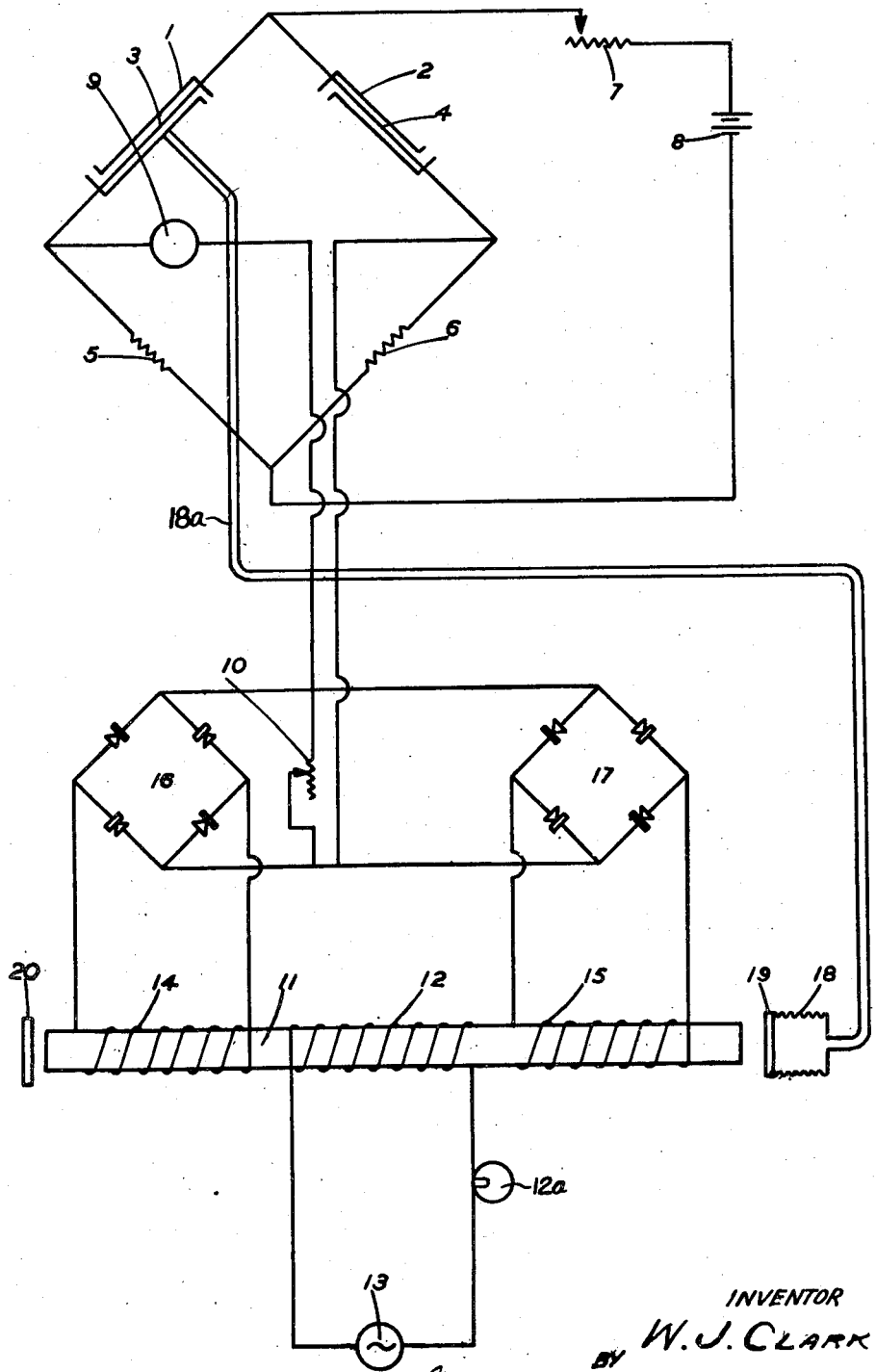

THERMAL CONDUCTIVITY ANALYSIS OF GASES

William Jasper Clark, Norton-on-Tees, England, assignor to Imperial Chemical Industries Limited, a corporation of Great Britain Application September 20, 1945, Serial No. 617,617
In Great Britain October 11, 1944

5 Claims. (Cl. 73—27)

This invention relates to the quantitative analysis of a gaseous mixture by measurement of its thermal conductivity.

It is known that the thermal conductivity of a gaseous mixture is a function of its composition. A common method of utilising this fact for quantitatively measuring changes in the composition of gaseous mixtures consists in enveloping an electrically heated wire by the gaseous mixture and measuring the variations in the resistance of the wire due to changes in its temperature caused by variations in the thermal conductivity of the gaseous mixture. In one form of instrument this wire forms one arm of a Wheatstone bridge circuit to which a constant current is fed. Change in thermal conductivity thus produces a change in the current across the bridge, and this change can be indicated or recorded by a suitable instrument.

The thermal conductivity of a gaseous mixture, however, is also a function of its pressure, the rate of change of conductivity with respect to pressure increasing with decrease in pressure. When the gaseous mixture is at atmospheric or higher pressures, small fluctuations in pressure do not substantially affect the thermal conductivity, but when the gaseous mixture is substantially below atmospheric pressure, small fluctuations in pressure cause appreciable alterations in thermal conductivity, which become increasingly important as the pressure of the gaseous mixture falls below about 100 mm. mercury absolute. Consequently apparatus of this known type does not accurately indicate quantitative changes in the composition of gaseous mixtures at low pressures.

The object of the present invention is to provide an instrument utilising the method hereinbefore described suitable for use with gaseous mixtures at subatmospheric pressures.

According to the present invention in apparatus of the type described, an E. M. F. adapted to vary with fluctuations in the pressure, is applied to the circuit of the measuring instrument, so as to counterbalance the change in potential difference across the heated wire produced by the fluctuations in the pressure of the gaseous mixture.

The E. M. F. may be provided by any suitable means, for example, by means of a suitably wound potentiometer, the sliding contact of which is moved by a system of levers actuated by a bellows which is subjected to the pressure of the gaseous mixture.

The accompanying drawing shows diagrammatically one form of the present invention. Referring to the drawing, 1 represents one chamber of a katharometer through which the gaseous mixture whose composition is to be measured is passed at a substantially constant rate. 2 is the other chamber of the katharometer through which a gas of standard composition, e. g., air, is passed at a substantially constant rate. The wires 3 and 4 in the katharometer chambers 1 and 2 form two arms of a Wheatstone bridge circuit, the remaining arms of which are indicated by reference numerals 5 and 6. Current is fed to the bridge circuit through an adjustable resistance 7 from a direct current source 8. Any out of balance current in the bridge circuit due to change in thermal conductivity of the gaseous mixture passing through the chamber 1 passes through the resistance 10 and an indicating instrument 9.

11 is an iron core provided centrally with a primary winding 12 supplied with alternating current from a suitable source 13. Two secondary coils 14 and 15 are wound on the iron core, the E. M. F.'s induced in the coils being rectified by the rectifying devices 16 and 17, and applied across the resistance 10. 18 is an elastic bellows which is subjected to the pressure of the gaseous mixture passing through the chamber 1, for example through a pipe connection 18a. The bellows carries an iron plate 19, separated from one end of the iron core by a small air gap which varies with the pressure of the gaseous mixture. A similar iron plate 20 is provided near the other end of the iron core, the air gap between them being adjusted so that with normal working pressure in the bellows 18, the E. M. F.'s induced in the coils 14 and 15 are equal and no E. M. F. is applied by them across the resistance 10. When the pressure of the gaseous mixture departs from normal, causing a change in the resistance of the wire 3 and therefore a change in the potential difference across the bridge, it also causes a displacement of the bellows 18, thereby upsetting the balance between the E. M. F.'s induced in the coils 14 and 15, and causing an E. M. F. to be applied by the rectifiers across the resistance 10, in opposition to the change in potential across the bridge. By suitable design of the core 11, its associated electrical circuits and the plates 19 and 20, it is possible by adjustment of the resistance 10 and of the air gaps between the core 11 and the plates 19 and 20 at the normal working pressure of the gaseous mixture, to make the E. M. F. applied by the rectifiers 16 and 17 across the resistance 10, cancel out the change in potential difference across the bridge circuit due to pressure changes over a considerable range.

The sensitivity of the apparatus depends on the current in the bridge circuit and it is therefore necessary to keep the current as steady as possible. We prefer to obtain it from an A. C. mains supply by means of a transformer in series with a current regulating lamp and a potentiometer, from which is tapped off a suitable voltage for rectification by any known means, for example, a metal rectifier, the direct current from which is fed to the bridge circuit. It is also necessary to maintain the current through the primary coil 12 as steady as possible, for example, by providing a current regulating lamp indicated at 12a in series with it.

I claim:

1. In apparatus for the quantitative thermal conductivity analysis of gaseous mixtures at subatmospheric pressure comprising an electrically heated wire, means for enveloping the said wire by the gaseous mixture, and current measuring means adapted to indicate changes in current through the wire, the provision of means for neutralising the effect of pressure changes of the gaseous mixture on the current measuring means, comprising a source of E. M. F., means for varying the E. M. F. in accordance with changes in the pressure of the gaseous mixture within the subatmospheric range and means for applying the E. M. F. to the circuit of the current measuring means.

2. In apparatus for the quantitative analysis of gaseous mixtures comprising a katharometer arranged in a Wheatstone bridge circuit, and current measuring means adapted to indicate changes in current through the katharometer, the provision of means for neutralising the effect of pressure changes in the gaseous mixture on the current measuring means, comprising a source of E. M. F., means for varying the E. M. F. in accordance with changes in the pressure of the gaseous mixture, means for adjusting and calibrating the range of change of E. M. F. to correspond with the absolute pressure of the gaseous mixture, and means for applying the E. M. F. to the circuit of the current measuring means.

3. Apparatus as claimed in claim 1 in which the source of E. M. F. comprises a primary coil and a secondary coil both mounted on a core of ferro-magnetic material, said primary coil being adapted to be fed with a steady alternating current, and the means for varying the E. M. F. comprises an armature near one end of the core and means for varying its distance from the core in accordance with changes in the pressure of the gaseous mixture.

4. Apparatus as claimed in claim 2 in which the source of E. M. F. comprises a primary coil and a secondary coil both mounted on a core of ferro-magnetic material, said primary coil being adapted to be fed with a steady alternating current and the means for varying the E. M. F. comprises an armature near one end of the core mounted on an elastic member adapted to be subjected to the pressure of the gaseous mixture, so as to vary the distance of the armature from the core in accordance with changes in the pressure of the gaseous mixture.

5. Apparatus as claimed in claim 1 in which the means for neutralising the effect of pressure changes of the gaseous mixture on the current measuring means comprises a core of ferro-magnetic material, carrying a primary coil and two secondary coils, one near each end of the core, means for feeding a steady alternating current to the primary coil, means for rectifying induced alternating E. M. F.'s in the secondary coils and applying them in opposition to each other to the circuit of the current measuring means, an armature near one end of the core mounted on an elastic member, means for subjecting the elastic member to the pressure of the gaseous mixture, so as to vary the distance of the armature from the core in accordance with changes in the pressure of the gaseous mixture, an armature near the other end of the core adapted to be adjusted for distance from the core so that at the predetermined normal gaseous pressure the E. M. F.'s from the secondary coils cancel out.

WILLIAM JASPER CLARK.

REFERENCES CITED

The following references are of record in the file of this patent:

UNITED STATES PATENTS

| Number | Name | Date |
|---|---|---|
| 2,251,751 | Minter | Aug. 5, 1941 |

FOREIGN PATENTS

| Number | Country | Date |
|---|---|---|
| 306,397 | Germany | Oct. 1, 1920 |
| 495,822 | Germany | Apr. 12, 1930 |